(12) United States Patent
Kim

(10) Patent No.: US 11,078,651 B2
(45) Date of Patent: Aug. 3, 2021

(54) FREEZE PREVENTION VALVE CAPABLE OF CONTROLLING DISCHARGE FLOW RATE ACCORDING TO TEMPERATURE

(71) Applicant: SM FAB Co., Ltd., Busan (KR)

(72) Inventor: Jae Il Kim, Busan (KR)

(73) Assignee: SM FAB CO., LTD., Busan (KR)

( * ) Notice: Subject to any disclaimer, the term of this patent is extended or adjusted under 35 U.S.C. 154(b) by 28 days.

(21) Appl. No.: 16/693,870

(22) Filed: Nov. 25, 2019

(65) Prior Publication Data

US 2021/0054604 A1 Feb. 25, 2021

(30) Foreign Application Priority Data

Aug. 21, 2019 (KR) .................. 10-2019-0102649

(51) Int. Cl.
*E03B 7/12* (2006.01)
*G05D 23/02* (2006.01)

(52) U.S. Cl.
CPC ............ *E03B 7/12* (2013.01); *G05D 23/022* (2013.01); *Y10T 137/1353* (2015.04)

(58) Field of Classification Search
CPC ... E03B 7/12; G05D 23/022; Y10T 137/1353; Y10T 137/1189
See application file for complete search history.

(56) References Cited

U.S. PATENT DOCUMENTS

| | | | | |
|---|---|---|---|---|
| 3,659,783 A * | 5/1972 | Schwartz | ........... | B60H 1/00485 236/93 R |
| 4,296,770 A * | 10/1981 | Rice | ............ | G05D 23/023 137/62 |
| 4,784,173 A * | 11/1988 | Carney | ........... | E03B 7/12 137/2 |
| 5,676,309 A * | 10/1997 | Lee, II | ........... | G05D 23/022 236/100 |
| 5,715,855 A * | 2/1998 | Bennett | ........... | E03B 7/12 137/60 |
| 6,363,960 B1 * | 4/2002 | Gauss | ........... | A01K 7/027 119/73 |
| 6,386,150 B1 * | 5/2002 | Iwaki | ........... | G05D 23/022 123/41.1 |
| 10,823,304 B2 * | 11/2020 | Morris | ........... | F16K 31/002 |
| 10,914,393 B2 * | 2/2021 | Tallos | ........... | E03B 7/04 |
| 2010/0032594 A1 * | 2/2010 | Lamb | ........... | F16K 31/002 251/11 |

FOREIGN PATENT DOCUMENTS

KR    10-0959416 B1    5/2010

* cited by examiner

*Primary Examiner* — Kevin R Barss
(74) *Attorney, Agent, or Firm* — Rabin & Berdo, P.C.

(57) ABSTRACT

The present invention relates to a freeze prevention valve capable of controlling a discharge flow rate according to a temperature. More particularly, the present invention relates to a freeze prevention valve capable of controlling a discharge flow rate according to a temperature, wherein the valve is to prevent freezing of a pipe by allowing a working fluid such as water flowing along various pipes including water pipes, faucets, and water meters to continuously flow without freezing at a temperature below a freezing point, and a shape memory elastic body which is a configuration of the valve can control a flow rate of the working fluid flowing out of the valve by proportionally changing a yield stress by a phase change according to a temperature of the working fluid instead of performing a simple opening/closing operation.

2 Claims, 7 Drawing Sheets

FREEZE PREVENTION VALVE CAPABLE OF CONTROLLING DISCHARGE FLOW RATE ACCORDING TO TEMPERATURE

TECHNICAL FIELD

The present invention relates to a freeze prevention valve capable of controlling a discharge flow rate according to a temperature. More particularly, the present invention relates to a freeze prevention valve capable of controlling a discharge flow rate according to a temperature, wherein the valve is to prevent freezing of a pipe by allowing a working fluid such as water flowing along various pipes including water pipes, faucets, and water meters to continuously flowing without freezing at a temperature below a freezing point, and a shape memory elastic body which is a configuration of the valve can control a flow rate of the working fluid flowing out of the valve by proportionally changing a yield stress by a phase change according to a temperature of the working fluid instead of performing a simple opening/closing operation.

BACKGROUND ART

In general, freeze accidents cause damage to buildings due to leakage of water as well as a water resource loss and cause a loss such as enormous maintenance costs for the maintenance work of freezing facilities, and thus efforts and measures to prevent the damage and the loss are required.

Currently, a technical field for freeze prevention may be classified into a heat reserving technique for blocking largely heat (heat transfer blocking, a heating device, and electronic metering), a response technique of solidification and expansion of water, and a circulation and discharge technique of water.

The heat transfer blocking technique corresponds to the heat reserving technique and is most of methods of installing an insulator or changing a material or structure of a case.

Further, the freeze prevention technique by the heating device prevents freezing of meters, pipes, etc. by automatically operating a heating device including a hot wire and like when an external temperature is detected and drops to a temperature where there is a risk of freeze.

The response technique of solidification and expansion of water is a technique corresponding to expansion involved when water in the meter is frozen by installing a member having elasticity such as an air bag therein because in the case of a water meter, while a volume is expanded when running water in the meter is frozen, glass for metering is broken.

Further, the circulation and discharge technique of water is a technique for preventing the freeze by circulating water in a meter or pipe or discharging water to the outside without using running water by using a principle in which water is not easily frozen when the water flows in the meter or pipe even if an external temperature is too low.

In the conventional freeze prevention techniques described above, separate heating energy and apparatus are required, and even in the circulation and discharge technique of water, since a flow rate of the discharged water cannot be controlled, there is a problem in a loss of leaked water and the like, and since a use life of the apparatus is relatively short and the configuration thereof is also relatively complicated, there is a problem in that installation and maintenance are not facilitated.

Prior Art Document: Korean Patent Registration No. 10-0959416 (issued on May 24, 2010)

DISCLOSURE

Technical Problem

The present invention is derived to solve the above problems, and an object of the present invention is to provide a freeze prevention valve capable of controlling a discharge flow rate according to a temperature, wherein the valve is to prevent freezing of a pipe by allowing a working fluid such as water flowing along various pipes including water pipes, faucets, and water meters to continuously flowing without freezing at a temperature below a freezing point, and a shape memory elastic body which is a configuration of the valve can control a flow rate of the working fluid flowing out of the valve by proportionally changing a yield stress by a phase change according to a temperature of the working fluid instead of performing a simple opening/closing operation.

Technical Solution

According to the present invention derived to achieve the objects, a freeze prevention valve capable of controlling a discharge flow rate according to a temperature comprises: a valve body having a working fluid inlet hole formed at an upper portion thereof so that a working fluid may flow thereinto; a disk which is located inside the valve body, has an opening/closing protrusion formed to protrude from an upper surface thereof, wherein the opening/closing protrusion inserted to the working fluid inlet hole formed in the valve body to block the working fluid from flowing into the valve body or withdrawn from the working fluid inlet hole to allow the working fluid to flow into the valve body through the working fluid inlet hole, and is lifted up or down in a vertical direction to perform an opening/closing operation of the working fluid inlet hole; a cap which is coupled to a lower portion of the valve body and has working fluid outlet holes 32 formed to allow the working fluid flowing into the valve body to flow out of the valve body; and a shape memory elastic body which is located between the disk and the cap, detects a temperature of external air or a working fluid, allows a yield stress to be changed according to the temperature of the external air or the working fluid, allows the opening/closing protrusion of the disk to be inserted or withdrawn into or from the working fluid inlet hole of the valve body by a water pressure of the working fluid acting to the disk, and allows the disk to perform an opening/closing operation.

The yield stress of the shape memory elastic body may be changed in proportion to a change in detected temperature of the external air or working fluid, wherein when the changed yield stress is smaller than the water pressure of the working fluid, a length of the shape memory elastic body may be contracted by the water pressure of the working fluid and then the opening/closing protrusion of the disk may be withdrawn from the working fluid inlet hole of the valve body to perform an opening operation, and when the changed yield stress is larger than the water pressure of the working fluid, the length of the shape memory elastic body may be expanded and then the opening/closing protrusion of the disk may be inserted into the working fluid inlet hole of the valve body to perform a closing operation, and the yield stress of the shape memory elastic body may be changed in proportion to a change in temperature of the external air or working fluid and a gap distance between the opening/closing protrusion of the disk and the working fluid inlet hole of the valve body may be changed to control a flow rate of the working fluid flowing out of the valve body.

The shape memory elastic body may primarily detect a temperature of external air heat-transferred to the valve body to allow the disk to perform an initial opening operation and secondarily detect the temperature of the working fluid when the working fluid flowing into the valve body is in direct contact with the shape memory alloy by the initial opening operation of the disk so that the yield stress is changed proportionally according to a temperature of the working fluid.

Advantageous Effects

According to the present invention, it is possible to reduce a loss of water by controlling a flow rate of a working fluid flowing out of a valve according to a temperature of the working fluid.

Further, since a structure thereof is simple, the installation and maintenance are facilitated.

MODES OF THE INVENTION

Figure 1:
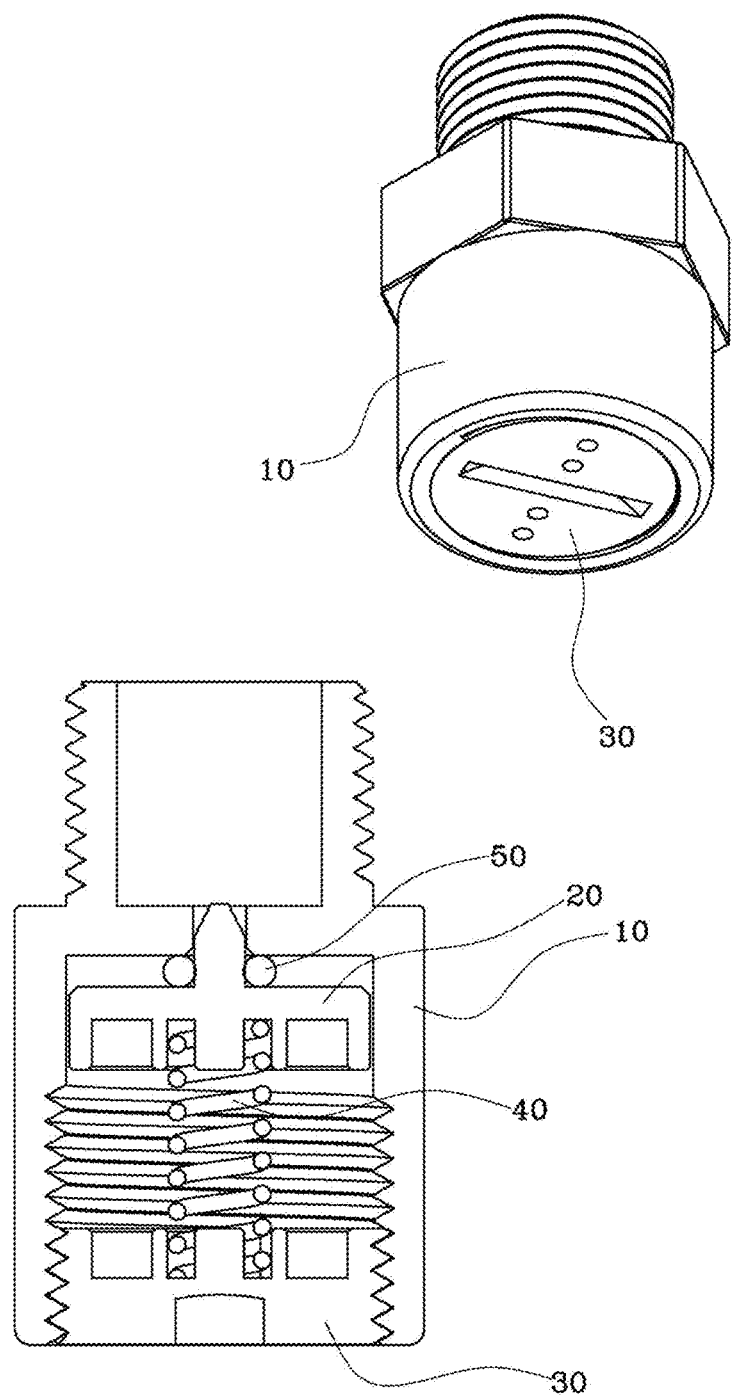
FIG. 1 is a view illustrating an internal configuration of a freeze prevention valve capable of controlling a discharge flow rate according to a temperature according to a preferred embodiment of the present invention.

Hereinafter, a preferred embodiment of the present invention will be described in detail with reference to the accompanying drawings. First, when reference numerals refer to components of each drawing, it is to be noted that although the same components are illustrated in different drawings, the same components are denoted by the same reference numerals as possible. In the following description, a detailed explanation of related known configurations or functions may be omitted to avoid obscuring the subject matter of the present invention. Further, hereinafter, the preferred embodiment of the present invention will be described, but the technical spirit of the present invention is not limited thereto or restricted thereby and the embodiments can be modified and variously executed by those skilled in the art.

Figure 2:
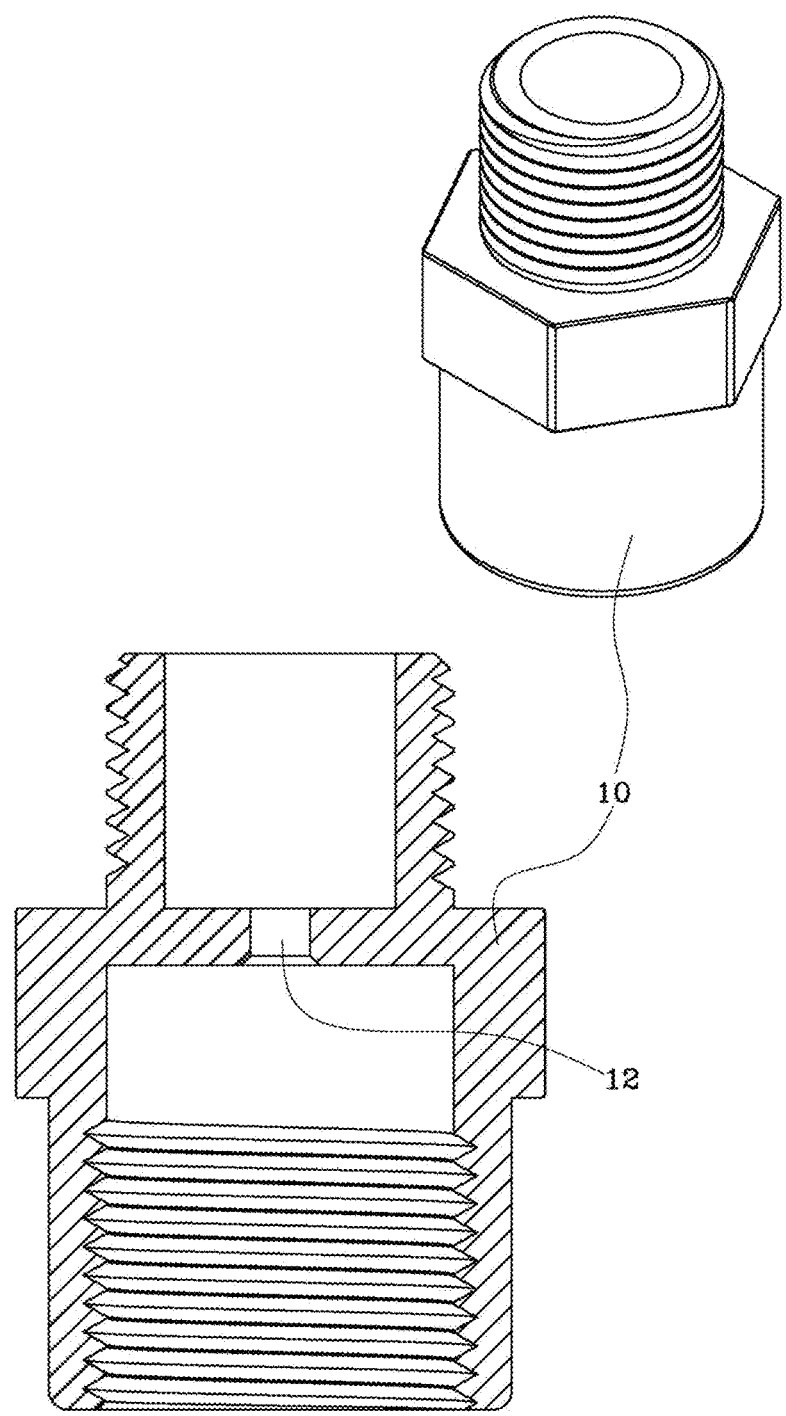
FIG. 2 is a view illustrating a straight valve body.
Figure 3:
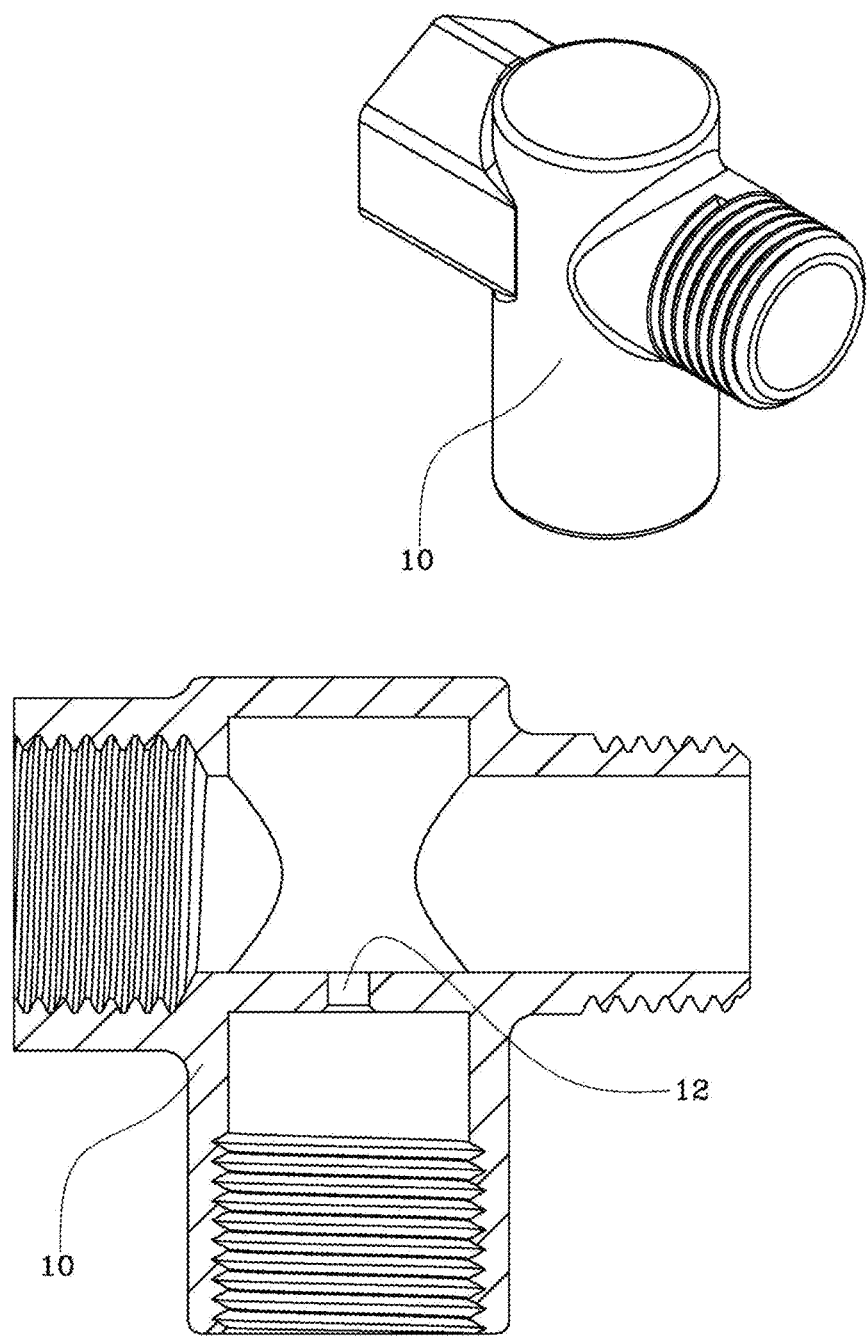
FIG. 3 is a view illustrating a T-shaped valve body.
Figure 4:
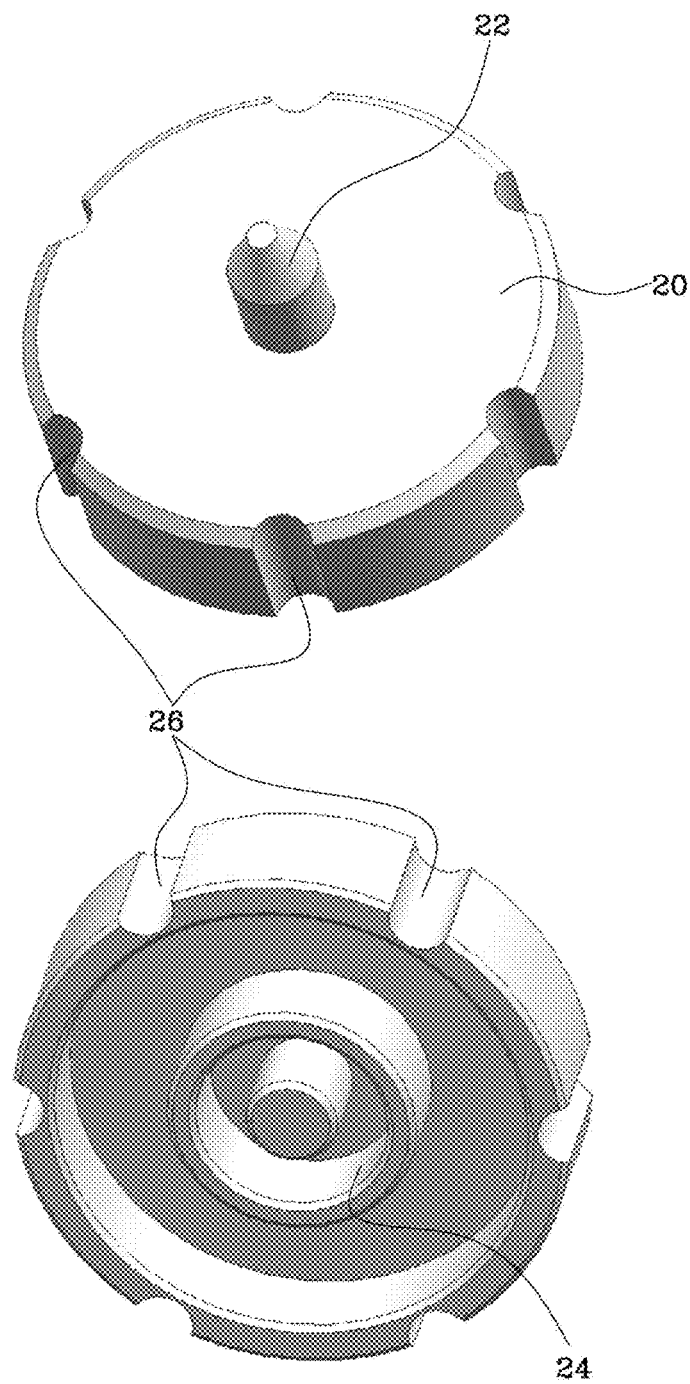
FIG. 4 is a view illustrating a disk.
Figure 5:
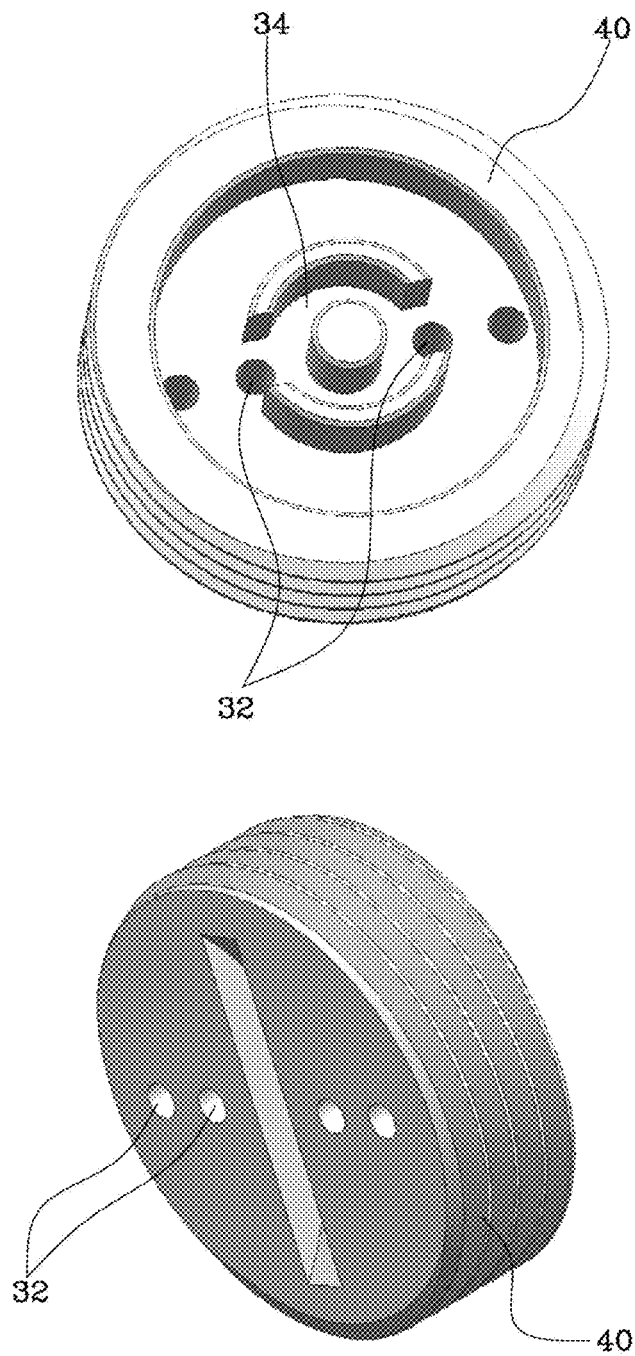
FIG. 5 is a view illustrating a cap.
Figure 6:
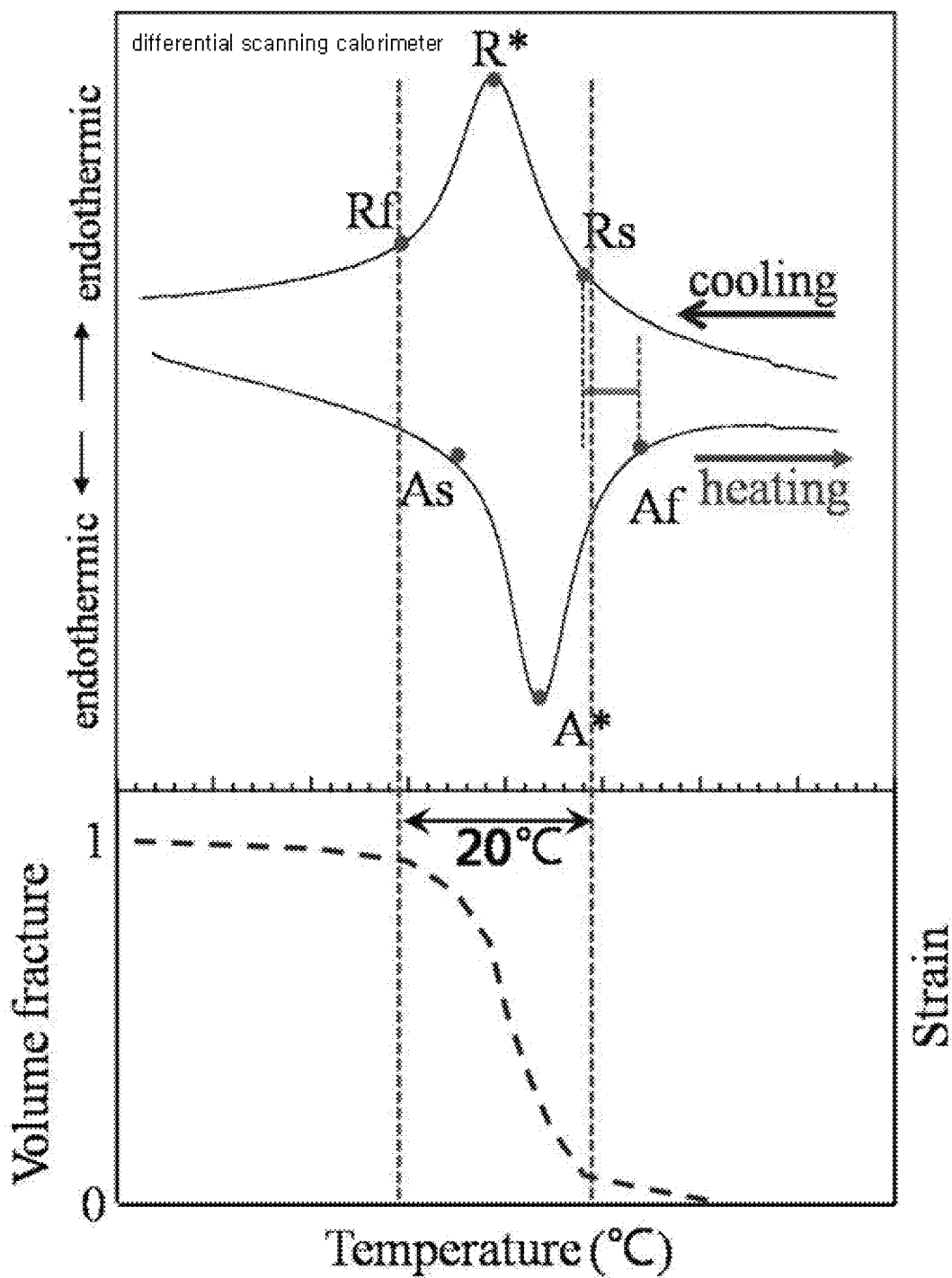
FIG. 6 is a view illustrating a change fraction of a shape memory elastic body according to a change in temperature of a working fluid.
Figure 7:
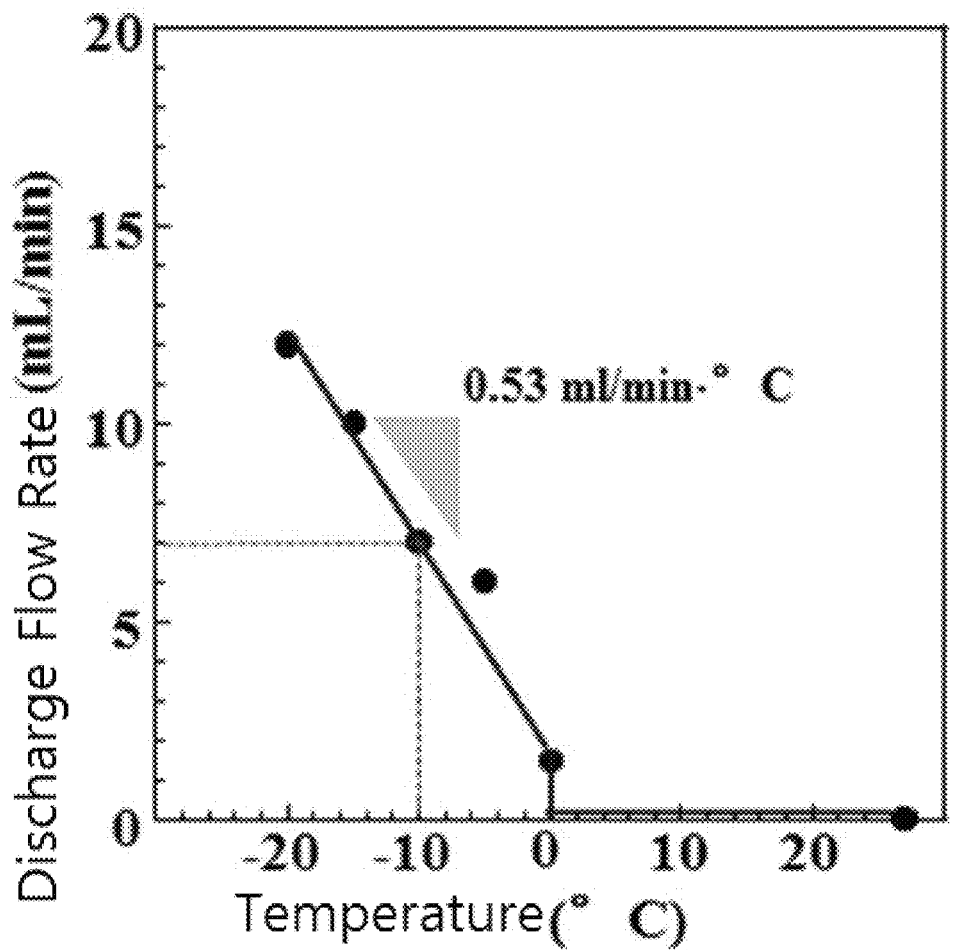
FIG. 7 is a view illustrating a discharge flow rate according to a change in temperature of a working fluid detected by a shape memory elastic body.

FIG. 1 is a view illustrating an internal configuration of a freeze prevention valve capable of controlling a discharge flow rate according to a temperature according to a preferred embodiment of the present invention, FIG. 2 is a view illustrating a straight valve body, FIG. 3 is a view illustrating a T-shaped valve body, FIG. 4 is a view illustrating a disk, FIG. 5 is a view illustrating a cap, FIG. 6 is a view illustrating a change fraction of a shape memory elastic body according to a change in temperature of a working fluid, and FIG. 7 is a view illustrating a discharge flow rate according to a change in temperature of a working fluid detected by a shape memory elastic body.

Referring to FIGS. 1 to 5, a freeze prevention valve capable of controlling a discharge flow rate according to a temperature according to a preferred embodiment of the present invention includes a valve body 10, a disk 20, a cap 30, a shape memory elastic body 40, and an airtight member 50.

Further, the freeze prevention valve capable of controlling the discharge flow rate according to the temperature according to the present invention is a valve for preventing freezing of a pipe by allowing a working fluid such as water flowing along various pipes including water pipes, faucets, and water meters to continuously flowing without freezing at a temperature below a freezing point, and a shape memory elastic body which is a configuration of the valve can control a flow rate of the working fluid flowing out of the valve by proportionally changing a yield stress by a phase change according to a temperature of the working fluid instead of performing a simple opening/closing operation.

Further, the shape memory elastic body 40 of the present invention primarily detects an external temperature to perform an initial opening/closing operation and then secondarily detects a temperature of a working fluid flowing into the valve to perform an opening/closing operation capable for controlling a flow rate flowing out of the valve.

Hereinafter, constituent elements of the freeze prevention valve capable of controlling the discharge flow rate according to the temperature according to the preferred embodiment of the present invention will be described in detail.

Referring to FIGS. 1 to 3, the valve body 10 is coupled on a pipe in which a working fluid such as water flows, such as a water pipe and a water meter and has a working fluid inlet hole 12 formed on an upper surface of the valve body 10 so that the working fluid may flow into the valve body 10.

The valve body 10 may use a straight valve body installed on a passage in which the working fluid flows in the pipe as illustrated in FIG. 2 and a T-shaped valve body installed at an end of the pipe as illustrated in FIG. 3.

Referring to FIG. 1, the disk 20 is lifted up or down in a vertical direction by an interaction between water pressures of the working fluid flowing along the shape memory elastic body 40 to be described below and the pipe and performs an opening/closing operation of allowing the working fluid to flow into the valve body 10 by opening the working fluid inlet hole 12 formed in the valve body 10 or blocking the working fluid from flowing into the valve body 10 by closing the working fluid inlet hole 12.

Referring to FIGS. 1 and 4, the disk 20 is located inside the valve body 10 and an opening/closing protrusion 22 protrudes from an upper side on an upper surface of the disk 20.

As illustrated in FIG. 1, the opening/closing protrusion 22 of the disk 20 is inserted into the working fluid inlet hole 12 formed in the valve body 10 to block the working fluid from flowing into the valve body 10 and withdrawn from the working fluid inlet hole 12 to allow the working fluid to flow into the valve body 10.

Referring to FIGS. 1 and 4, an upper elastic body insertion groove 24 to which an upper portion of the shape memory elastic body 40 described below may be inserted and coupled is formed below the disk 20.

Further, when the working fluid flows into the valve body through the working fluid inlet hole 12 of the valve body 10, in order to allow the working fluid to smoothly flow downward to the disk, as illustrated in FIG. 4, one or more working fluid flowing grooves 26 may be formed in the disk to be spaced apart from each other along a periphery of the disk.

Referring to FIGS. 1 and 5, the cap 30 is coupled to a low portion of the valve body 10 and one or more working fluid outlet holes 32 are formed to allow the working fluid flowing into the valve body 10 to flow out of the valve body 10.

Further, a lower elastic body insertion groove 34 to which an upper portion of the shape memory elastic body 40 described below may be inserted and coupled is formed below the cap 30.

As illustrated in FIG. 1, the shape memory elastic body 40 is located between the disk 20 and the cap 30.

Specifically, the upper portion of the shape memory elastic body 40 is inserted and coupled to the upper elastic body insertion groove 24 formed below the disk 20 and the lower portion of the shape memory elastic body 40 is inserted and coupled to the lower elastic body insertion groove formed above the cap 30.

The shape memory elastic body 40 is manufactured by annealing and heating at a predetermined temperature range 300° C. to 600° C. and designed to detect a temperature by heat transfer of external air or the working fluid and change the yield stress and strain by a phase change as the temperature of the external air or the working fluid is changed.

The shape memory elastic body 40 detects the temperature of the external air or the working fluid, and the yield stress is changed by a phase change according to a temperature of the external air or the working fluid and thus, the rigidity of the shape memory elastic body 40 is changed.

Further, as the yield stress of an shape memory alloy changed according to a temperature is larger or smaller than a water pressure of the working fluid, the opening/closing protrusion 22 of the disk 20 is withdrawn or inserted from or into the working fluid inlet hole 12 of the valve body 10 to allow the disk 20 to perform the opening/closing operation.

Specifically, as illustrated in FIG. 6, a phase change is gradually performed in the memory elastic body 40 in proportion to the temperature change of the external air or working fluid detected by the shape memory elastic body 40, and thus the yield stress is also gradually changed. In the shape memory elastic body 40, at 0° C. or higher, the yield stress of a water pressure (3.0 atm) or more of the working fluid flowing into the pipe such as a general water pipe is maintained, and at 0° C. or lower, the yield stress becomes a water pressure (3.0 atm) or less of the working fluid by a phase change. As the temperature of the external air or working fluid is more lowered, the yield stress is gradually decreased in proportion thereto and the strain is also gradually and largely changed, and thus a discharge amount of the working fluid discharged through the working fluid outlet hole of the cap is increased.

Here, in the case where the yield stress changed according to the temperature of the external air or working fluid is smaller than the water pressure of the working fluid, that is, when the rigidity of the shape memory elastic body 40 is smaller than the water pressure of the working fluid, when the disk 20 is pushed downward by the water pressure of the working fluid, the opening/closing protrusion 22 of the disk 20 is withdrawn from the working fluid inlet hole 12 of the valve body 10 to perform the opening operation while the shape memory elastic body 40 is contracted in a length direction. At this time, the working fluid flows into the valve body 10 through the working fluid inlet hole 12.

Further, in the case where the yield stress of the shape memory elastic body 40 changed according to the temperature of the external air or working fluid is larger than the water pressure of the working fluid, when the disk 20 is pushed upward while the shape memory elastic body 40 is expended in a length direction, the opening/closing protrusion 22 of the disk 20 is inserted into the working fluid inlet hole 12 of the valve body 10 to perform the closing operation. At this time, the working fluid does not flow into the valve body 10 through the working fluid inlet hole 12.

Meanwhile, in the shape memory elastic body 40, the yield stress is changed in proportion to a temperature change of the external air or working fluid to change a gap distance between the opening/closing protrusion 22 of the disk 20 and the working fluid inlet hole 12 of the valve body 10.

As illustrated in FIG. 7, a change in the gap distance controls a flow rate of the working fluid flowing into the valve body 10 through the working fluid inlet hole 12 according to a temperature detected by the shape memory elastic body 40, and as a result, may control a flow rate of the working fluid flowing out of the valve body 10 through the working fluid outlet hole 32 formed in the cap 30.

In other words, as the temperature of the external air or working fluid is gradually lowered at 0° C. or lower, while a gap distance between the opening/closing protrusion 22 of the disk 20 and the working fluid inlet hole 12 of the valve body 10 is gradually increased, a large amount of working fluid flows into the valve body 10 through the working fluid inlet hole 12 and simultaneously, the flowed working fluid flows out of the valve body 10 through the working fluid outlet hole 32 formed in the cap 30.

Table 1 below illustrates experimental results for the freeze prevention valve capable of controlling the discharge flow rate according to the temperature according to the present invention by data and FIG. 7 illustrates the data of Table 1 by a graph. As seen in Table 1 and FIG. 7, it may be confirmed that as the temperature detected by the shape memory elastic body 40 is lowered, the discharged flow rate is increased proportionally.

TABLE 1

| Time (min) | Temperature (° C.) | Discharge amount (mL) | Discharge amount (mL/min) |
|---|---|---|---|
| 0 | 21 | 0 | 0 |
| 10 | 3 | 0 | 0 |
| 45 | 3 | 0 | 0 |
| 48 | 2 | 0 | 0 |
| 83 | 1 | 0 | 0 |
| 97 | 0 | 60 | 1 |
| 116 | −1 | 300 | 5 |
| 137 | −1 | | |
| 168 | −3 | 300 | 5 |
| 194 | −3 | 330 | 5.5 |
| 210 | −4 | 330 | 5.5 |
| 219 | −6 | 420 | 7 |
| 254 | −7 | 540 | 9 |
| 275 | −8 | 540 | 9 |
| 293 | −8 | 540 | 9 |
| 343 | −11 | 600 | 10 |
| 365 | −14 | 630 | 10.5 |
| 378 | −14 | 660 | 11 |
| 401 | −15 | 720 | 12 |
| 417 | −16 | 660 | 11 |
| 434 | −16 | 660 | 11 |
| 447 | −17 | 780 | 13 |
| 459 | −19 | 720 | 12 |
| 468 | −20 | 810 | 13.5 |
| 479 | −20 | 810 | 13.5 |
| 495 | −20 | 810 | 13.5 |

Meanwhile, the shape memory elastic body 40 primarily detects a temperature of external air heat-transferred to the valve body 10 to allow the disk 20 to perform an initial opening operation.

Further, when the working fluid flowing into the valve body 10 through the working fluid inlet hole 12 is in direct contact with the shape memory alloy by the initial opening operation of the disk 20, the shape memory elastic body 40 secondarily detects the temperature of the working fluid so that the yield stress is changed proportionally according to a temperature of the working fluid.

Referring to FIG. 1, in the airtight member 50, an elastic member such as robber and silicon may be used in an O-ring shape and provided to be extrapolated to an outer peripheral surface of the opening/closing protrusion 22 formed on the disk 20.

The airtight member 50 is provided to maintain an airtight state between the disk 20 and the working fluid inlet hole 12 so as to prevent the working fluid from flowing into the valve body 10 while the opening/closing protrusion 22 formed on the disk 20 is inserted into the working fluid inlet hole 12 formed in the valve body 10, that is, while the working fluid is blocked not to flow into the valve body 10 through the working fluid inlet hole 12.

The above description just illustrates the technical spirit of the present invention and various changes, modifications, and substitutions can be made by those skilled in the art to which the present invention pertains without departing from an essential characteristic of the present invention. Therefore, the exemplary embodiments and the accompanying drawings disclosed in the present invention are used to not limit but describe the technical spirit of the present invention and the scope of the technical spirit of the present invention is not limited by the exemplary embodiments and the accompanying drawings. The protective scope of the present invention should be construed based on the appended claims, and all the technical spirits in the equivalent scope thereof should be construed as falling within the scope of the present invention.

| [Explanation of reference numerals and symbols] | |
| --- | --- |
| 10: Valve body | 12: Working fluid inlet hole |
| 20: Disk | 22: Opening/closing protrusion |
| 24: Upper elastic body insertion groove | 26: Working fluid flowing groove |
| 30: Cap | 32: Working fluid outlet hole |
| 34: Lower elastic body insertion groove | 40: Shape memory elastic body |
| 50: Airtight member | |

What is claimed is:

1. A freeze prevention valve capable of controlling a discharge flow rate according to a temperature comprising:
    a valve body having a working fluid inlet hole formed at an upper portion thereof so that a working fluid may flow thereinto;
    a disk which is located inside the valve body, has an opening/closing protrusion formed to protrude from an upper surface thereof, wherein the opening/closing protrusion inserted to the working fluid inlet hole formed in the valve body to block the working fluid from flowing into the valve body or withdrawn from the working fluid inlet hole to allow the working fluid to flow into the valve body through the working fluid inlet hole, and is lifted up or down in a vertical direction to perform an opening/closing operation of the working fluid inlet hole;
    a cap which is coupled to a lower portion of the valve body and has working fluid outlet holes formed to allow the working fluid flowing into the valve body to flow out of the valve body; and
    a shape memory elastic body which is located between the disk and the cap, detects a temperature of external air or a working fluid, allows a yield stress to be changed according to the temperature of the external air or the working fluid, allows the opening/closing protrusion of the disk to be inserted or withdrawn into or from the working fluid inlet hole of the valve body by a water pressure of the working fluid acting to the disk, and allows the disk to perform an opening/closing operation;
    wherein the shape memory elastic body primarily detects a temperature of external air heat-transferred to the valve body to allow the disk to perform an initial opening operation and secondarily detects the temperature of the working fluid when the working fluid flowing into the valve body is in direct contact with the shape memory alloy by the initial opening operation of the disk so that the yield stress is changed proportionally according to a temperature of the working fluid.

2. The freeze prevention valve capable of controlling a discharge flow rate according to a temperature of claim 1, wherein the yield stress of the shape memory elastic body is changed in proportion to a change in detected temperature of the external air or working fluid, wherein when the changed yield stress is smaller than the water pressure of the working fluid, a length of the shape memory elastic body is contracted by the water pressure of the working fluid and then the opening/closing protrusion of the disk is withdrawn from the working fluid inlet hole of the valve body to perform an opening operation, and when the changed yield stress is larger than the water pressure of the working fluid, the length of the shape memory elastic body is expanded and then the opening/closing protrusion of the disk is inserted into the working fluid inlet hole of the valve body to perform a closing operation, and
    the yield stress of the shape memory elastic body is changed in proportion to a change in temperature of the external air or working fluid and a gap distance between the opening/closing protrusion of the disk and the working fluid inlet hole of the valve body is changed to control a flow rate of the working fluid flowing out of the valve body.

* * * * *